UNITED STATES PATENT OFFICE.

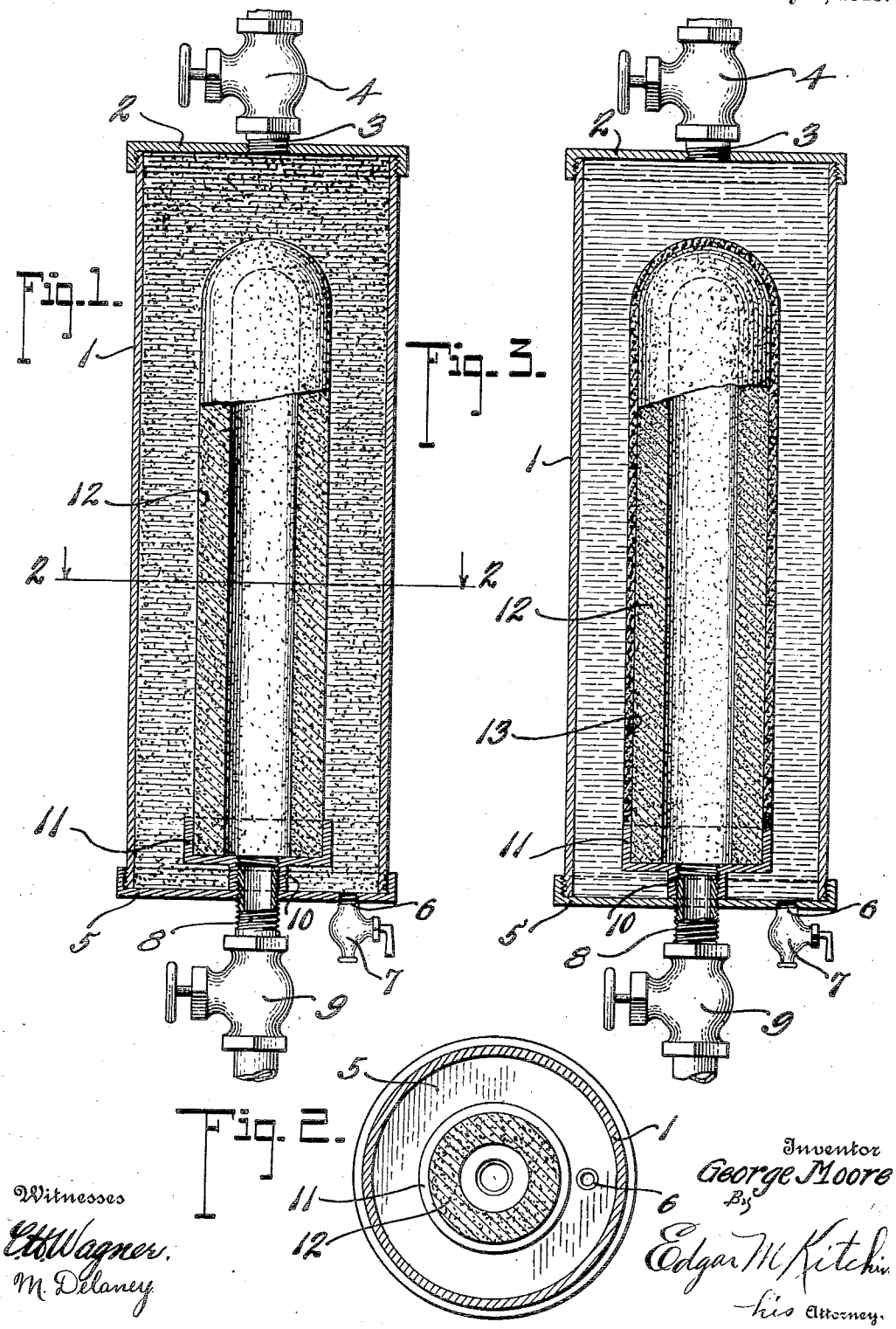

GEORGE MOORE, OF JOPLIN, MISSOURI.

FILTER AND METHOD OF MAKING SAME.

1,309,330.　　　　Specification of Letters Patent.　　　Patented July 8, 1919.

Application filed July 15, 1915.　Serial No. 40,116.

*To all whom it may concern:*

Be it known that I, GEORGE MOORE, a citizen of the United States, residing at Joplin, in the county of Jasper and State of Missouri, have invented certain new and useful Improvements in Filters and Methods of Making Same; and I do hereby declare the following to be a full, clear, and exact description of the invention, such as will enable others skilled in the art to which it appertains to make and use the same.

It has heretofore been proposed to construct a filter by depositing on a clay, porcelain, or other like porous body, a bed of filtering material, such as aluminum hydroxid, but difficulty has been experienced in avoiding cracking of such a bed. To overcome the tendency to crack, it has been proposed to utilize mineral wool or other fiber.

An object of the present invention is the obtaining of all the advantages gained by the employment of such a filter bed formed of chemical precipitates, while avoiding the undesirable cracking and, at the same time, avoiding the necessity for employment of a fibrous binder.

With this and further objects in view, as will in part hereinafter be stated and in part become apparent, the invention comprises certain novel steps in the mode of making filters and certain novel features of construction, combinations and arrangements of parts in filter structures, as will subsequently be rendered apparent, and in part be specifically pointed out.

In the accompanying drawing:

Figure 1 is a longitudinal, vertical, central section through an apparatus illustrating the method in the course of being carried out, and a filter product in the course of its formation.

Fig. 2 is a transverse section taken on the plane indicated by line 2—2 of Fig. 1, and looking downward.

Fig. 3 is a view similar to Fig. 1 of the same parts after the method has been completed.

In the carrying out of the improved method, a supporting body of baked clay or like porous material, such as has heretofore been used as a filter, is taken, and one preferred form of such body is that of a tube closed at one end and open at the other. On the exterior or exposed surface of this body, a filter bed coating is deposited by having the body submerged in a pulp formed by depositing barium sulfate, preferably the pulverized mineral barite, in water and agitating the mass. This pulp, of course, is retained in an appropriate container, and the filter body is submerged in the pulp and then the liquid from the pulp is forced through the filter body by a difference in pressure at the exposed or influx surface of the body from that at the effluent surface thereof, and this flow is maintained until a sufficient quantity of barite is deposited in the form of a uniform coating or bed on the exposed surface of the filter body to provide the desired additional filtering material designed for and destined to protect the filter body against receiving deposits of bacteria.

The filter bed of comminuted barite in course of formation is caused to have the same amount of resistance at one point as at all other points of its surface to the inflow or filtrate therethrough. This uniformity of resistance is insured because, during the formation of the filter bed, if, at any moment, a weak spot appears, that is, a point of lower resistance than the resistance at adjacent points, the freedom of passage of fluid at the weak spot will insure increased inflow at such point, which will consequently produce more rapid building up of solids at that point than at other points until the increased deposit has rendered the resistance at the weak spot the same as at all other points, and the entire filter bed, when finished, will, therefore, offer uniform resistance throughout to the influx of filtrate.

The difference in pressure which effects the depositing of the comminuted barite may be produced and maintained either from a suction applied to the effluent surface of the filter body or by pressure exerted toward the filter body on the surface of the pulp, and for purposes of this case, the exertion of pressure on the surface of the pulp toward the influx surface of the filter body may be deemed the preferred method for producing and maintaining the necessary difference in pressure.

In the accompanying drawing is illustrated graphically the steps of the process and its product. In said drawings, 1 indicates a tank or container, having its upper end closed at 2, through which closure extends a supply pipe 3, for fluid under pressure. The pipe 3 is controlled by a valve 4. A bottom closure 5 is detachably connected to the lower end of the container 1, the closure 2 being also detachably connected for facilitating the cleansing of the container. A drain pipe 6 communicates through the closure 5 and is provided with a valve 7. A discharge pipe 8 extends through the closure 5 and is provided with a valve 9. Engaging and preferably threaded on to the inner end portion of pipe 8 within container 1, is an internally threaded sleeve 10, which is formed integral with or appropriately fixed to a cap 11. The lower end of a cylindrical, tubular filter body 12 extends into cap 11 and has its bore opening into the bore of sleeve 10, so as to discharge into pipe 8. The body 12 is formed of baked clay, porcelain, or like porous substance of sufficient stability to be self-sustaining, being of such material as has heretofore been used as a filter, but which has been found objectionable for such use because of the deposits of bacteria, which make their appearance in the pores of such filter body after a certain amount of use, which bacteria continues to increase with continued use until eventually, the bacteria germinates within the pores of such filter body and finally increases to the extent of discharging within the filter body at the effluent surface thereof. Such depositing of bacteria has been avoided heretofore by preventing access of the bacteria to the influx or exterior surface of the filter body by the use of a protecting filter bed or coating on the filter body. This coating has commonly been formed of chemical precipitates, with which must be used some binder to avoid cracking of the coating or filter bed, and even then, small fissures or cracks occur, which allow access of bacteria from the "raw" water to the surface of the filter body. To avoid this serious objection, in the course of carrying out the present improved process and for producing the present improved filter, the tank or container 1 is filled with the pulp consisting of a mixture of water and finely comminuted barite.

In practice, the body 12 which is fixed within the cap 11, is first applied by having the sleeve 10 threaded on to the inner end of pipe 8, and then the cap or closure 5 is threaded or otherwise detachably secured on to the end of the container 1. The pulp is then supplied through pipe 3, or of course it could have been supplied in bulk until the container was filled before the cap 2 was positioned. The container 1, being filled with pulp, and the filter body 12 being in the position indicated in Fig. 1, fluid under pressure is admitted through pipe 3, as for example, water may be admitted, or additional pulp, under such head of pressure as will cause the water from the pulp within container 1 to pass through the walls of filter body 12 and discharge from the bore of the body out through the pipe 8. Of course, it is understood that the upper end of the body 12 is closed preferably by having the material of the body rounded as indicated in the drawing. This discharge of liquid from the pulp is continued until a coating or filter bed 13 is formed, having a uniform resistance throughout all points to the influx of liquid, and thereupon, the completed filter is ready for use.

The use of the filter may occur within the tank 1 or elsewhere under similar conditions, its use consisting merely of the supplying of water as through the pipe 3 to the tank 1, under pressure sufficient for causing the water to penetrate the filter bed or coating 13 and to pass through the walls of the filter body 12 and from there to discharge through the bore of the filter body and out through pipe 8. The water so discharged will be found to be free from bacteria and at the same time, even after any possible extent of use, it will also be found that no deposit of bacteria is present in the body 12 because the coating or bed 13 has effectively prevented approach of bacteria to the filter body 12. The extent of use of any particular coating 13 will, of course, depend on the amount of algæ and other foreign substances present in the water, the presence of which is manifested by the accumulation on the surface of coating 13, forming a film thereover, which eventually becomes practically incapable of being penetrated by the water. Therefore, when the discharge becomes too slow for practical purposes, the operator will know that the coating of foreign substances on the filter bed 13 has arrived at the point where a new filter bed is required, and thereupon, the body 12 and its connected parts will be removed from the container, and the coating 13 removed from the filter body 12 by either being cut, scraped or scrubbed away, and then a new coating 13 applied as above described.

I find that the comminuted barite when deposited to form a filter bed, as above set forth, assumes a more compact condition than is obtainable with powdered charcoal, aluminium hydroxid and other like substances heretofore employed, so that in addition to providing a superior bed in the matter of avoiding cracking without requiring a binder, the bed is also superior in its physical capacity for straining the filtrate and preventing solids of any kind, including bacteria, from passing with the filtrate to the supporting filter body 12. Furthermore, the fact that barite is white, or nearly white, renders more readily visible collected foreign substances, since algæ and bacterial organic matter are usually of a brown or dark color.

What I claim is:

1. The method of making filters comprising applying a filter film of barium sulfate to a supporting porous walled filter.

2. The method of making filters comprising applying a filter film of comminuted barite to a supporting porous walled filter.

3. The method of making filters comprising immersing a porous walled filter in a body of pulp containing barite, and depositing solids from the pulp on the supporting filter, and forming a filter film thereon, offering substantially uniform resistance at all points to the passage of filtrate through the filter film.

4. The method of making filters comprising immersing a porous walled filter in a body of pulp formed of comminuted barite and a liquid, and passing the liquid through the supporting filter for depositing thereon a filter film offering substantially uniform resistance at all points to the passage of filtrate through the filter film.

5. The method of making filters comprising immersing a porous walled filter in pulp containing barium sulfate, and maintaining a difference in pressure between the influx and effluent surface of the filter for forcing liquid from the pulp through the filter for depositing a filter film of solids of the pulp on the influx surface of the filter.

6. The method of making filters comprising immersing a porous walled filter in pulp containing barite, and maintaining a difference in pressure between the influx and effluent surfaces of the filter for forcing liquid from the pulp through the filter for depositing a filter film of solids of the pulp on the influx surface of the filter.

7. The method of making filters comprising immersing the influx surface of a porous walled filter in a pulp containing barite while leaving the effluent surface of said filter free for drainage, and exerting pressure on the body of pulp toward the influx surface of the filter for forcing liquid from the pulp through the filter and thereby depositing solids of the pulp in the form of a filter film on the influx surface of the filter.

8. A filter comprising a porous walled filter, and a filter film of barium sulfate on the influx surface of said filter.

9. A filter comprising a porous walled filter, and a filter film of comminuted barite on the influx surface of said filter.

10. A filter comprising a porous walled filter, and a filter film of barium sulfate on the influx surface of said filter, said film being of a form and consistency offering substantially uniform resistance at all points to the passage of liquid through the film.

11. A filter comprising a porous walled filter, and a filter film of comminuted barite on the influx surface of said filter, said film being of a form and consistency offering substantially uniform resistance at all points to the passage of liquid through the film.

12. A filter comprising a porous walled filter, and a filter film deposited on said filter and formed of comminuted material being at least in part formed of barite, the deposit being of such a character as to offer substantially uniform resistance at all points of the exposed surface of the film to the passage of liquid through the film.

13. A filter comprising a film formed of barite and a support therefor.

14. A filter comprising a film formed of barium sulfate and a support therefor.

15. The method of forming a filter comprising applying a film of barite to a support.

16. A filter comprising a support of filtering material and a filter bed thereon of barite, the filter bed being constructed to provide substantially the same area of surface at the effluent side as at the influx side of the filter.

In testimony whereof I affix my signature in presence of two witnesses.

GEORGE MOORE.

Witnesses:
  E. G. HOAG,
  L. H. MOORE.